(12) United States Patent
Wang et al.

(10) Patent No.: US 8,398,292 B2
(45) Date of Patent: Mar. 19, 2013

(54) OPTICAL UNIT AND LIGHT GUIDE PLATE AND INK THEREOF

(75) Inventors: Chin-Ming Wang, Tainan County (TW); Hung-Wen Wang, Tainan County (TW); Hsi-Hsin Shih, Tainan County (TW); Shao-Ming Lee, Tainan County (TW); Chien-Tsung Wu, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 414 days.

(21) Appl. No.: 12/688,265

(22) Filed: Jan. 15, 2010

(65) Prior Publication Data

US 2011/0176313 A1    Jul. 21, 2011

(51) Int. Cl.
*F21V 7/22* (2006.01)
*F21V 8/00* (2006.01)
(52) U.S. Cl. ........................ 362/627; 362/624
(58) Field of Classification Search .................. 362/618, 362/624, 627
See application file for complete search history.

(56) References Cited

U.S. PATENT DOCUMENTS

| | | | | | |
|---|---|---|---|---|---|
| 5,196,960 | A | * | 3/1993 | Matsuzaki et al. | 359/453 |
| 5,237,004 | A | * | 8/1993 | Wu et al. | 525/85 |
| 5,377,084 | A | * | 12/1994 | Kojima et al. | 362/618 |
| 5,932,342 | A | * | 8/1999 | Zeira et al. | 428/327 |
| 7,022,388 | B2 | * | 4/2006 | Hashimoto et al. | 428/34.9 |
| 7,039,286 | B2 | * | 5/2006 | Leu et al. | 385/129 |
| 7,157,025 | B2 | * | 1/2007 | Ichimura et al. | 252/582 |
| 7,205,709 | B2 | * | 4/2007 | Yamamoto et al. | 313/483 |
| 7,278,775 | B2 | * | 10/2007 | Yeo et al. | 362/627 |
| 7,295,592 | B2 | * | 11/2007 | Hiramatsu et al. | 372/101 |
| 7,611,262 | B2 | * | 11/2009 | Chang | 362/246 |
| 7,967,492 | B2 | * | 6/2011 | Nagasawa et al. | 362/618 |

* cited by examiner

*Primary Examiner* — Alan Cariaso
(74) *Attorney, Agent, or Firm* — WPAT, P.C.; Anthony King

(57) ABSTRACT

The present invention relates to an optical unit and light guide plate and ink thereof. The ink includes a base resin and a plurality of fine particles. The base resin has a first refractive index. The fine particles have a second refractive index and are dispersed in the base resin. The fine particles are made of organic polymer. The difference between the first refractive index and second refractive index is less than 0.15. The use of the ink will lower the color difference and the variation of color temperature of the light guide plate or the optical unit.

20 Claims, 2 Drawing Sheets

OPTICAL UNIT AND LIGHT GUIDE PLATE AND INK THEREOF

BACKGROUND OF THE INVENTION

1. Field of the Invention

The present invention relates to an optical unit and light guide plate and ink thereof, and more particularly to an ink having organic fine particles and optical unit and light guide plate including the same.

2. Description of the Related Art

FIG. 1 shows a schematic view of a conventional backlight module. The backlight module 1 includes a light source 11, a reflector 12, a light guide plate 13 and a diffusion film 16. The light source 11, for example, a plurality of LEDs or CCFLs, is used to provide a light beam. The reflector 12 is disposed below the light guide plate 13, and is used to reflect part of the light beam.

The light guide plate 13 is used to receive and mix the light beam from the light source 11. The light guide plate 13 includes a light guide plate body 14 and an ink 15. The light guide plate body 14 has a first surface 141, a second surface 142 and a side surface 143. The first surface 141 is opposite the second surface 142, and the side surface 143 is adjacent to the first surface 141 and the second surface 142. The light source 11 faces the side surface 143, so that the light beam enters the light guide plate body 14 through the side surface 143 and is then transmitted to the diffusion film 16 through the second surface 142. The material of the light guide plate body 14 is transparent polymer, for example, polymethyl methacrylate (PMMA) or polycarbonate (PC).

The ink 15 is printed on the first surface 141 of the light guide plate body 14 to form a pattern, so as to reflect the light beam back to the interior of the light guide plate body 14. The ink 15 includes a base resin, a filler, a solvent, an additive and a curing agent. The material of the base resin is epoxy resin, polyester resin, acrylic resin, polyvinyl resin, polyamide resin or polyurethane resin. The material of the filler is inorganic, for example, silica.

However, since the filler is inorganic, the backlight module 1 has drawbacks such as high color difference and high variation of color temperature. Usually, the color difference measured between the points on a surface of a panel 17 above the diffusion film 16 is greater than 0.01. Such phenomenon will become more obvious when the optical path length of the light beam is longer.

Therefore, it is necessary to provide an optical unit and light guide plate and ink thereof to solve the above problems.

SUMMARY OF THE INVENTION

The present invention is directed to an ink, which comprises a base resin and a plurality of fine particles. The base resin has a first refractive index. The fine particles have a second refractive index and are dispersed in the base resin. The fine particles are mainly made of organic polymer. The first refractive index and the second refractive index are different and the difference is less than 0.15.

The present invention is further directed to a light guide plate, which comprises a light guide plate body and an ink. The light guide plate body has a first surface. The ink is disposed on the first surface of the light guide plate body so as to reflect a light beam back to the interior of the light guide plate body. The ink comprises a base resin and a plurality of fine particles. The base resin has a first refractive index. The fine particles have a second refractive index and are dispersed in the base resin. The fine particles are mainly made of organic polymer. The first refractive index and the second refractive index are different and the difference is less than 0.15.

The present invention is further directed to an optical unit, which comprises a light source and a light guide plate. The light source is used to provide a light beam. The light guide plate is used to receive the light beam from the light source. The light guide plate comprises a light guide plate body and an ink. The light guide plate body has a first surface. The ink is disposed on the first surface of the light guide plate body so as to reflect a light beam back to the interior of the light guide plate body. The ink comprises a base resin and a plurality of fine particles. The base resin has a first refractive index. The fine particles have a second refractive index and are dispersed in the base resin. The fine particles are mainly made of organic polymer. The first refractive index and the second refractive index are different and the difference is less than 0.15.

In the present invention, the fine particles of the ink are mainly made of organic polymer; therefore, the use of the ink will lower the color difference and the variation of color temperature of the light guide plate or the optical unit.

DETAILED DESCRIPTION OF THE INVENTION

Figure 1:
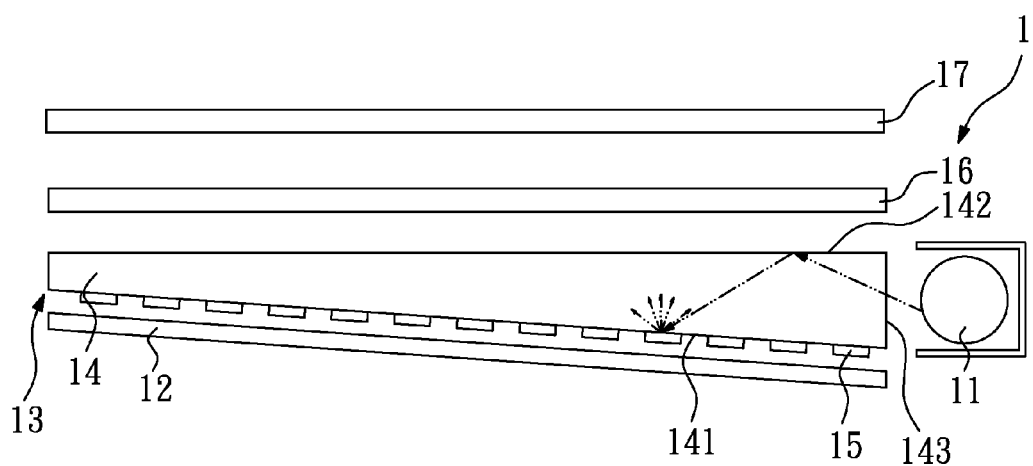
FIG. 1 is a schematic view of a conventional backlight module.
Figure 2:
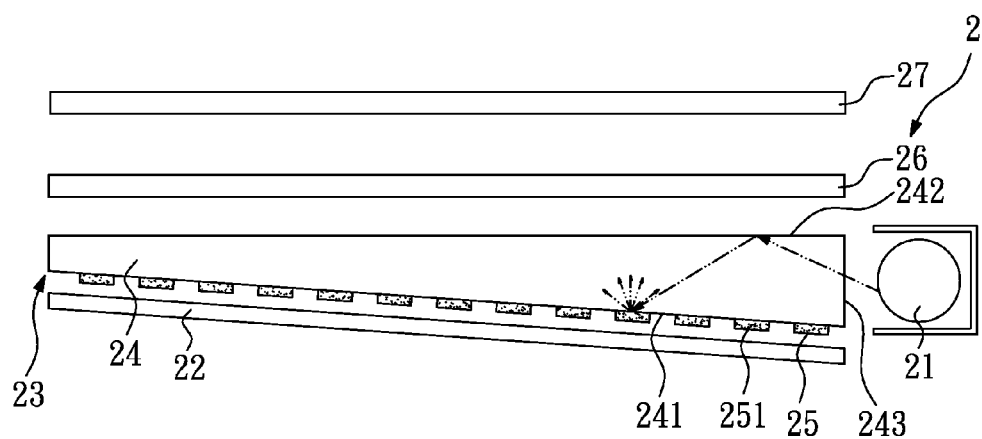
FIG. 2 is a schematic view of an optical unit according to a first embodiment of the present invention.

FIG. 2 shows a schematic view of an optical unit according to a first embodiment of the present invention. The optical unit 2 is an edge-lighting backlight module, which comprises a light source 21, a reflector 22, a light guide plate 23 and a diffusion film 26. The light source 21, for example, a plurality of LEDs, CCFLs or a combination thereof, is used to provide a light beam. The reflector 22 is disposed below the light guide plate 23, and is used to reflect part of the light beam.

The light guide plate 23 is used to receive and mix the light beam from the light source 21. The light guide plate 23 comprises a light guide plate body 24 and an ink 25. The light guide plate body 24 has a first surface 241, a second surface 242 and a side surface 243. The first surface 241 is opposite to the second surface 242, and the side surface 243 is adjacent to the first surface 241 and the second surface 242. The light source 21 faces the side surface 243, so that the light beam enters the light guide plate body 24 through the side surface 243 and is then transmitted to the diffusion film 26 through the second surface 242. The material of the light guide plate body 24 is transparent polymer, preferably polymethyl methacrylate (PMMA), acrylic-based polymer, polycarbonate (PC), polyethylene terephthalate (PET) or polystyrene (PS) or a copolymer thereof.

The ink 25 is disposed on the first surface 241 of the light guide plate body 24 to form a pattern, so as to destroy the total reflection of the light beam and reflect the light beam back to the interior of the light guide plate body 24. Preferably, the ink 25 is printed on the first surface 241. The ink 25 comprises a base resin, a plurality of fine particles 251, a solvent, an additive and a curing agent. The base resin comprises at least one selected from the group consisting of epoxy resin, polyester resin, acrylic resin, polyvinyl resin, polyamide resin, polyurethane resin, a copolymer thereof and a combination thereof. The base resin has a first refractive index. The additive can be an antifoaming agent, a leveling agent or a thixotropic agent, according to the need.

The fine particles have a second refractive index and are dispersed in the base resin. The first refractive index and the second refractive index are different and the difference is less than 0.15, preferably less than 0.05. The fine particles are mainly made of organic polymer, which comprises at least one selected from the group consisting of epoxy, polyester (PES), polymethyl methacrylate (PMMA), acrylic-based polymer, polyvinyl, polyamide (PA), polyurethane (PU), polystyrene (PS), a copolymer thereof and a combination thereof.

In the embodiment, the average particle size ($\overline{D}$) of the fine particles is less than 15 μm, and the particle size distribution (P) of the fine particles is less than 5. The average particle size ($\overline{D}$) of the fine particles is given by the following: $\overline{D}=\Sigma Di\ Ni/\Sigma Ni$, where Di is the diameter of each fine particle, and Ni is the number of the fine particles having the diameter Di. And, the particle size distribution (P) of the fine particles is given by the following:

$$P=(\Sigma Di^2\ Ni/\Sigma Di\ Ni)/(\Sigma Di\ Ni/\Sigma Ni)$$

In the embodiment, the amount of the fine particles is 1 to 60 weight % of the ink, preferably 20 to 50 weight % of the ink. Referring now to below Table, the maximum color difference in the CIE 1931 color space measured among the points on the surface of a panel 27 above the diffusion film 26 is shown. The chromaticity diagram illustrates the all number in the CIE 1931 xyz color space. The $x_{max}$ is the maximum chromaticity among the points in the CIE 1931 color space, and the $x_{min}$ is the minimum chromaticity among the points in the CIE 1931 color space. The $y_{max}$ is the maximum chromaticity among the points in the CIE 1931 color space, and the $y_{min}$ is the minimum chromaticity among the points in the CIE 1931 color space.

In compared with conventional ink containing $SiO_2$ fine particles, the inks of the present invention, which contains PMMA fine particles, instead of $SiO_2$, show a lower color difference. The improvement is better when the amount of the PMMA fine particles is about 20 weight % of the ink. And, the PMMA, 0%, containing neither $SiO_2$ nor PMMA fine particles, also shows better performance the conventional ink having 8 weight % $SiO_2$.

TABLE

| Fine particles | Measurement result | |
| --- | --- | --- |
| (weight %) | Δx ($x_{max} - x_{min}$) | Δy ($y_{max} - y_{min}$) |
| $SiO_2$, 8% | 0.0080 | 0.0134 |
| PMMA, 0% | 0.0061 | 0.0090 |
| PMMA, 20% | 0.0035 | 0.0068 |
| PMMA, 33% | 0.0038 | 0.0075 |
| PMMA, 50% | 0.0041 | 0.0074 |

In the embodiment, the ink 25 is disposed on the first surface 241 of the light guide plate body 24. However, it is understood that the ink 25 may be further disposed on the second surface 242 of the light guide plate body 24. That is, the ink 25 may be disposed on one side or both sides of the light guide plate body 24.

In the present invention, the fine particles of the ink 25 are made of organic polymer; therefore, the use of the ink 25 will lower the color difference and the variation of color temperature of the light guide plate 23 or the optical unit 2.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. An ink comprising:
   a base resin, having a first refractive index; and
   a plurality of fine particles, having a second refractive index and being dispersed in the base resin, wherein the fine particles comprising an organic polymer, and wherein the first refractive index and the second refractive index are different and the difference is less than 0.15, a particle size distribution P of the fine particles is given by the following:

$P=(\Sigma Di^2\ Ni/\Sigma Di\ Ni)/(\Sigma Di\ Ni/\Sigma Ni)$, where Di is the diameter of each fine particle, Ni is the number of the fine particles having the diameter Di, and the particle size distribution of the fine particles is less than 5.

2. The ink as claimed in claim 1, wherein the base resin comprises at least one selected from the group consisting of epoxy resin, polyester resin, acrylic resin, polyvinyl resin, polyamide resin, polyurethane resin, a copolymer thereof and a combination thereof.

3. The ink as claimed in claim 1, wherein the organic polymer is selected from the group consisting of epoxy, polyester (PES), polymethyl methacrylate (PMMA), acrylic-based polymer, polyvinyl, polyamide (PA), polyurethane (PU), polystyrene (PS), a copolymer thereof and a combination thereof.

4. The ink as claimed in claim 1, wherein the average particle size of the fine particles is less than 15 μm.

5. The ink as claimed in claim 1, wherein the amount of the fine particles is 20 to 50 weight % of the ink.

6. A light guide plate comprising:
   a light guide plate body, having a first surface; and
   an ink disposed on the first surface of the light guide plate body, the ink comprising:
   a base resin, having a first refractive index; and
   a plurality of fine particles, having a second refractive index and being dispersed in the base resin, wherein the fine particles comprising an organic polymer, and wherein the first refractive index and the second refractive index are different and the difference is less than 0.15, a particle size distribution P of the fine particles is given by the following:

$P=(\Sigma Di^2\ Ni/\Sigma Di\ Ni)/(\Sigma Di\ Ni/\Sigma Ni)$, where Di is the diameter of each fine particle, Ni is the number of the fine particles having the diameter Di, and the particle size distribution of the fine particles is less than 5.

7. The light guide plate as claimed in claim 6, wherein the material of the light guide plate body is polymethyl methacrylate (PMMA), acrylic-based polymer, polycarbonate (PC), polyethylene terephthalate (PET), polystyrene (PS) or a copolymer thereof.

8. The light guide plate as claimed in claim 6, wherein the base resin comprises at least one selected from the group consisting of epoxy resin, polyester resin, acrylic resin, polyvinyl resin, polyamide resin, polyurethane resin, a copolymer thereof and a combination thereof.

9. The light guide plate as claimed in claim 6, wherein the organic polymer is selected from the group consisting of epoxy, polyester (PES), polymethyl methacrylate (PMMA), acrylic-based polymer, polyvinyl, polyamide (PA), polyurethane (PU), polystyrene (PS), a copolymer thereof and a combination thereof.

10. The light guide plate as claimed in claim 6, wherein the average particle size of the fine particles is less than 15 μm.

11. The light guide plate as claimed in claim 6, wherein the amount of the fine particles is 20 to 50 weight % of the ink.

12. An optical unit comprising:
a light source for providing a light beam; and
a light guide plate for receiving and mixing the light beam from the light source, the light guide plate comprising:
a light guide plate body, having a first surface; and
an ink disposed on the first surface of the light guide plate body, the ink comprising a base resin and a plurality of fine particles, the base resin having a first refractive index, the fine particles having a second refractive index and being dispersed in the base resin, wherein the fine particles comprising an organic polymer, and wherein the first refractive index and the second refractive index are different and the difference is less than 0.15, a particle size distribution P of the fine particles is given by the following:

$$P = (\Sigma Di^2 Ni / \Sigma Di\, Ni) / (\Sigma Di\, Ni / \Sigma Ni),$$

where Di is the diameter of each fine particle, Ni is the number of the fine particles having the diameter Di, and the particle size distribution of the fine particles is less than 5.

13. The optical unit as claimed in claim 12, wherein the light source is an LED, a CCFL, or a combination thereof.

14. The optical unit as claimed in claim 12, wherein the light guide plate body further has a side surface adjacent to the first surface, the light source faces the side surface, and the light beam enters the light guide plate body through the side surface.

15. The optical unit as claimed in claim 12, wherein the light guide plate body further has a side surface and a second surface opposite to the first surface, the side surface is adjacent to the first surface and the second surface, the light source faces the side surface, and the light beam enters the light guide plate body through the side surface.

16. The optical unit as claimed in claim 12, wherein the material of the light guide plate body is polymethyl methacrylate (PMMA), acrylic-based polymer, polycarbonate (PC), polyethylene terephthalate (PET) or polystyrene (PS) or a copolymer thereof.

17. The optical unit as claimed in claim 12, wherein the base resin comprises at least one selected from the group consisting of epoxy resin, polyester resin, acrylic resin, polyvinyl resin, polyamide resin, polyurethane resin, a copolymer thereof and a combination thereof.

18. The optical unit as claimed in claim 12, wherein the fine particles comprises at least one selected from the group consisting of epoxy, polyester (PES), polymethyl methacrylate (PMMA), acrylic-based polymer, polyvinyl, polyamide (PA), polyurethane (PU), polystyrene (PS), a copolymer thereof and a combination thereof.

19. The optical unit as claimed in claim 12, wherein the average particle size of the fine particles is less than 15 μm.

20. The optical unit as claimed in claim 12, wherein the amount of the fine particles is 20 to 50 weight % of the ink.

* * * * *